(12) United States Patent
Hiett

(10) Patent No.: US 6,477,152 B1
(45) Date of Patent: Nov. 5, 2002

(54) APPARATUS AND METHOD FOR DATA COMMUNICATIONS

(75) Inventor: John H. Hiett, Phoenix, AZ (US)

(73) Assignee: Honeywell Inc., Morristown, NJ (US)

( * ) Notice: Subject to any disclaimer, the term of this patent is extended or adjusted under 35 U.S.C. 154(b) by 0 days.

(21) Appl. No.: 09/224,214

(22) Filed: Dec. 30, 1998

(51) Int. Cl.$^7$ .......................... H04B 7/185; H04B 7/00
(52) U.S. Cl. ...................... 370/316; 370/310
(58) Field of Search .............................. 370/310, 316, 370/352; 455/12.1, 151.2

(56) References Cited

U.S. PATENT DOCUMENTS

| | | |
|---|---|---|
| 5,717,878 A | 2/1998 | Sannino |
| 5,852,721 A | 12/1998 | Dillon et al. |
| 6,201,797 B1 * | 3/2001 | Leuca ........................ 370/316 |

FOREIGN PATENT DOCUMENTS

| | | |
|---|---|---|
| EP | 97300754.5 | 2/1997 |
| GB | 2 304 499 | 3/1997 |
| GB | 2 313 981 | 12/1997 |
| WO | PCT/US98/23963 | 11/1998 |

OTHER PUBLICATIONS

ARINC741, Part 4, *Aviation Satellite Communication System: Specification and Description Language*, May 15, 1992, AEEC.
*Satellite Communication Systems for Multimedia Services*, Araki et al, IEEE, 1993, pp. 690–695.
ARINC741, Part 3, *Aviation Satellite Communication System: Specification and Description Language*, Jan. 15, 1994, AEEC.
ARINC622–2, *ATS Data Link Applications Over ACARS Air–Ground Network*, Dec. 20, 1994, AEEC.
ARINC741, Part 1, *Aviation Satellite Communication System: Aircraft Installation Provisions*, Dec. 30, 1994, AEEC.
ARINC746, *Cabin Communications Systems*, Apr. 1, 1996, AEEC.
ARINC741, Part 2, *Aviation Satellite Communication System: System Design and Equipment Functional Description*, Nov. 15, 1996, AEEC.
ARINC758, *Communications Management Unit*, Apr. 30, 1997, AEEC.
*Inmarsat aeronautical services*, Nov. 1998, Inmarsat.
http://www.direcpc.com/about/a36f.html, *About DirecPC*, Nov. 30, 1998.

* cited by examiner

Primary Examiner—Wellington Chin
Assistant Examiner—Brenda Pham (57) ABSTRACT

An improved technique for retrieving data information from various data sources provides a less costly, and yet faster and more reliable method for retrieving information while aboard a transportation vehicle, such as, for example, an aircraft. In addition, the data communication system provides a technique and apparatus for accessing and controlling direct broadcasting systems to facilitate the retrieval of desired information on an expedited basis. The data communications system may be carried out in one form by a data communications system having a data source, an information request system coupled to the data source and adapted to request data information from the data source, and a receiver coupled to the data source and adapted to receive the data information requested the information request system.

12 Claims, 5 Drawing Sheets

APPARATUS AND METHOD FOR DATA COMMUNICATIONS

FIELD OF THE INVENTION

The present invention relates to communications, and more particularly, to systems for requesting and receiving data from a remote data source.

BACKGROUND OF THE INVENTION

Data communications continue to pervade more aspects of business and personal communications as the technology develops. The increased use of electronic systems to communicate, such as via e-mail, the worldwide web, and various global networks, has brought increased dependence on the availability of such systems. Although many offices and homes are well-connected, mobile data communications are less mature.

Problems associated with mobile data communications are particularly acute on commercial aircraft. Commercial aircraft passengers demand faster and cheaper access to information sources used in their offices and homes, but many options are expensive, impractical, or unavailable. For example, many mobile communications systems rely on cellular modems to connect a computer to a service provider. Cellular systems, however, generally cannot be used on aircraft for a variety of technical and regulatory reasons. Similarly, wireless local area networks (LANs) are effective in some environments, but are generally unsuitable for aircraft, due in part to the limited range of such LANs. The current primary alternative for passengers on commercial aircraft is to connect to a service provider using the dedicated air-to-ground telephones available to passengers on some aircraft. Access charges for such telephones, however, are high, especially for low rate or high content data transfers requiring considerable time to complete the transaction.

SUMMARY OF THE INVENTION

A communications system according to various aspects of the present invention may comprise a data source, an information request system coupled to the data source and adapted to request information from the data source, and a receiver coupled to the data source and adapted to receive the information requested by the information request system. The data source may comprise any conventional data source, such as an internet service provider, and the receiver may comprise any suitable receiver for receiving data from the data source. The information request system is coupled to the data source by any appropriate medium, such as airport wireless LAN, VHF radio signal, or satellite link, and may vary the type of connection according to the availability of various communications media. Similarly, the receiver is coupled to the data source via any appropriate and available medium, such as a satellite link, and is suitably different from the medium coupling the information request system to the data source.

BRIEF DESCRIPTION OF THE DRAWING

A more complete understanding of the present invention may be derived by referring to the detailed description and claims when considered in connection with the figures, where like reference numbers refer to similar elements throughout the figures, and:

DETAILED DESCRIPTION OF PREFERRED EMBODIMENTS OF THE INVENTION

The present invention is described in part in terms of functional block components and various processing steps. It should be appreciated that such functional blocks may be realized by any number of hardware and/or software components configured to perform the specified functions. For example, the present invention may employ various integrated circuit components, drivers, antennas, signal processors and the like, which may carry out a variety of functions under the control of one or more microprocessors or other control devices. In addition, the present invention may be practiced in any number of contexts and the data communication system described herein is merely one exemplary application for the invention.

General

Figure 1:
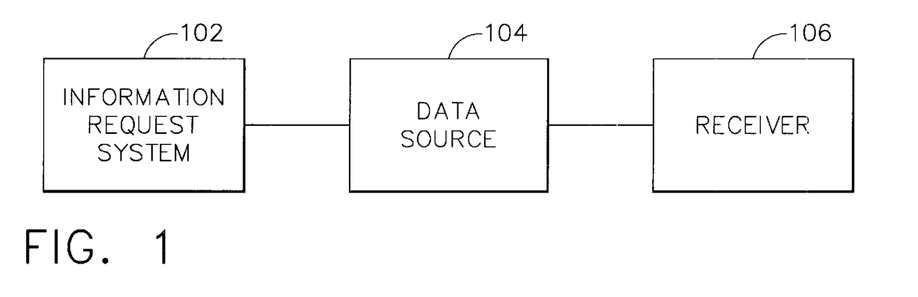
FIG. 1 is a schematic representation of a data communication system in accordance with the present invention.

Referring now to FIG. 1, in accordance with a preferred embodiment of the present invention, a communication system 100 for requesting and receiving information comprises an information request system 102, a data source 104, and a receiver 106. The information request system 102 is suitably coupled to the data source 104 via a first communication medium 208, and the receiver 106 is suitably coupled to the data source 104 via a second communication medium 210. The first and second communication media 208, 210 may be the same or different media, or separate channels of the same medium. Requests for information are generated via the information request system 102 and transmitted to the data source 104 via the first communication medium 210. In response, the data source 104 transmits the requested information to the receiver 106 via the second communication medium 210. The information request system 102 and the receiver 106 are remote from the data source 104. In an exemplary embodiment, the information request system 102 and the receiver 106 are located aboard a vehicle, such as a commercial or noncommercial aircraft, helicopter, ship, train, or automobile.

Data Source

Data source 104 stores or channels information, such as news, weather, entertainment, financial, or sports information, or any other type of information, receives requests for information from the information request system 102, and transmits the requested data to the receiver 106. The data source 104 may comprise any appropriate source of data, such as an internet service provider (ISP), a host computer system, a remotely accessible network server, a dedicated or general information database configured to store selected information, or other information sources capable of transmitting requested information.

Second Communication Medium

Figure 3:
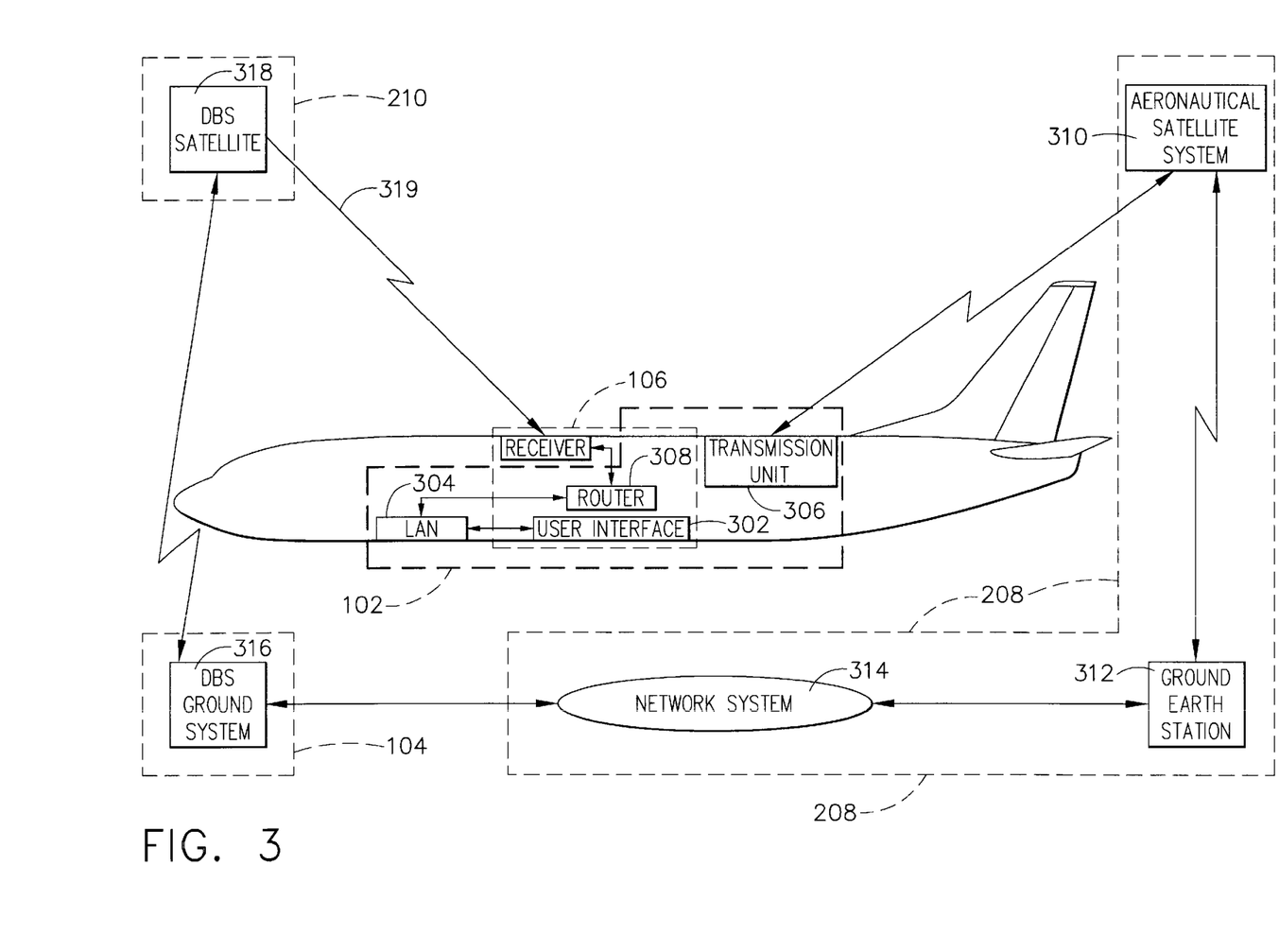
FIG. 3 is a schematic representation of a preferred embodiment of a data communication system as incorporated in an aircraft.
Figure 4:
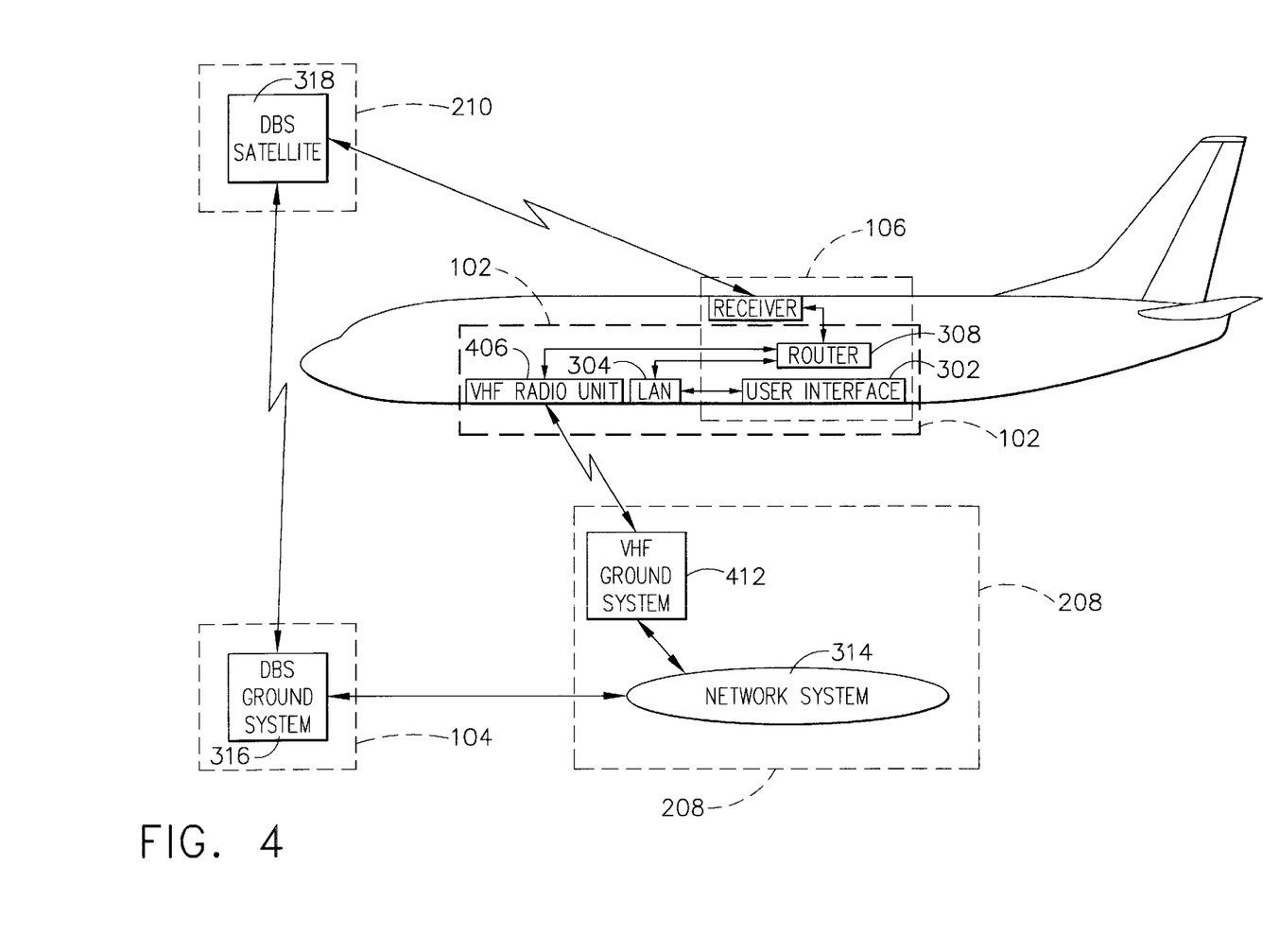
FIG. 4 is a schematic representation of an alternative preferred embodiment of the data communication system shown in FIG. 3.
Figure 5:
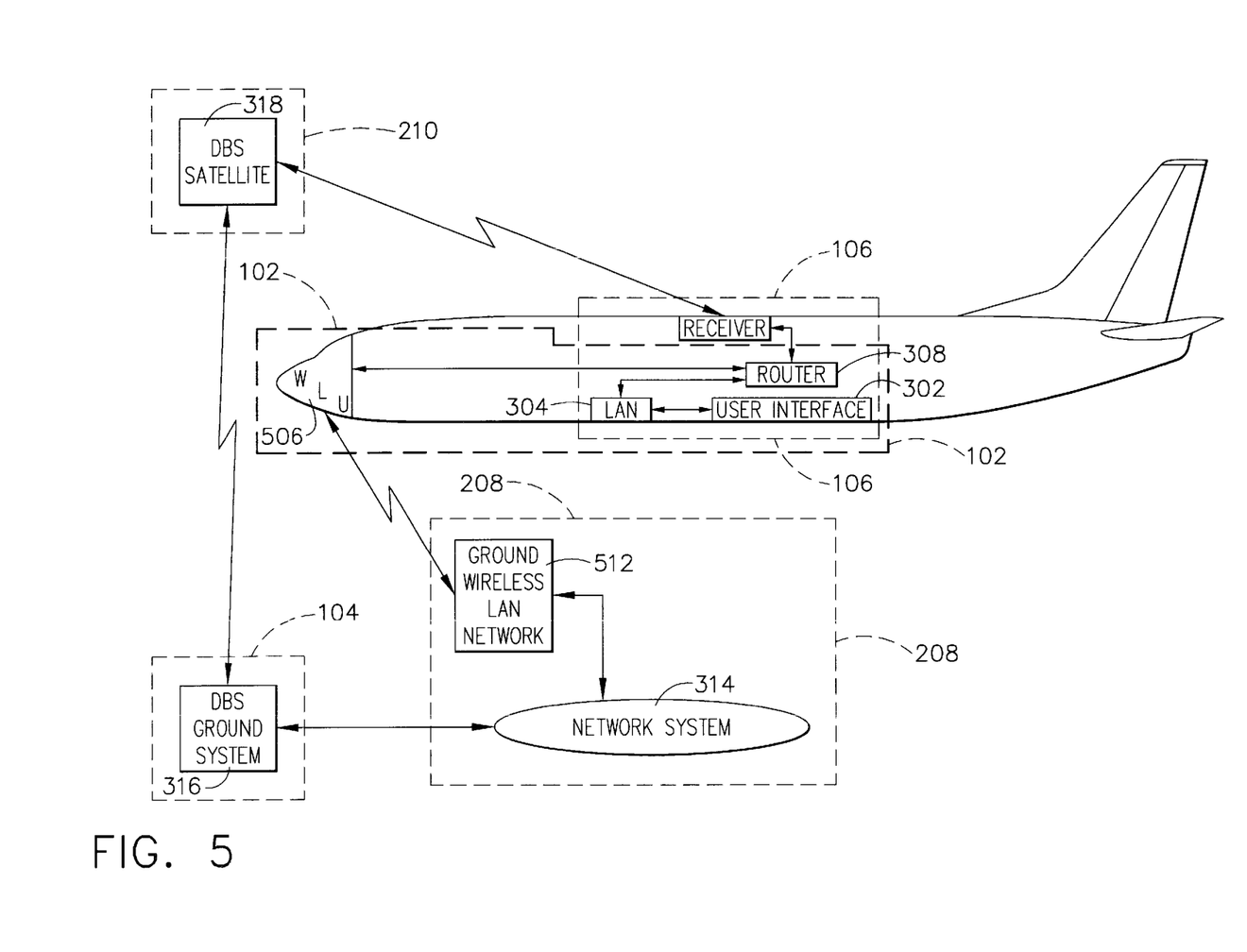
FIG. 5 is a schematic representation of another alternative preferred embodiment of the data communication system shown in FIG. 3.

Referring to FIGS. 3 through 5, the data source 104 of the present embodiment comprises a digital satellite source or digital broadcast system provider which provides, for example, internet access by receiving requests for data via the a conventional telephone network 314 and transmitting the data via a satellite link 319, such as a direct satellite . The satellite link 319 facilitates access to greater bandwidth than reliance solely on the telephone system 314 and affords relatively high data transfer rates from the data source 104 to the receiver 106. Accordingly, the second communication medium 210 of the present embodiment comprises a satellite link between the data source 104 and the receiver 106.

In accordance with various aspects of the present invention, however, second communication medium 210 may comprise any medium or plurality of media capable of transmitting information from data source 104 to receiver 106. For example, second communication medium 210 may comprise a wire, infrared signal, microwave signal, fiber optic cable, radio signal, laser signals, or acoustic signal. In addition, second communication medium 210 may comprise, for example, a general network system, public or private, suitably coupled to data source 104 to transmit information to receiver 106, such as a conventional telephone network or television cable network. Moreover, second communication medium 210 may comprise a remote ground data center coupled to data source 104 and configured to facilitate transfer of information from data source 104 to receiver 106 via satellite communications, radio communications, wireless cellular communications or direct cable communications and/or the like. The second communication medium 210 may comprise any suitable medium according to the characteristics of the data source 104, the receiver 106, and any other appropriate factors, such as the distance between the receiver 106 and the data source 104. Further, the second communication medium 210 may comprise multiple media, which may be used individually or in any suitable combination to transfer requests to the data source 104. Second communication medium 210 may suitably comprise any arrangement of components and utilize any communication methodology, now known or hereafter devised, to facilitate the transmission of data information from data source 104 to receiver 106. Second communication medium 210 preferably accommodates high data rates relative to the data rate of the first communication medium 208 because, in the present embodiment, data source 104 tends to transfer significantly more data to the receiver 106 than the information request system 102 provides to the data source 104.

In one embodiment, second communication medium 210 may comprise multiple communications media available to the data source 104 for transmission of the information. For example, the data source 104 may have access to a satellite link and a conventional cable link. The data source 104 may transmit the requested information via one or both media. The data source 104 may elect the appropriate media according to any criteria, including instructions received from the information request system 102, availability of resources, anticipated cost, or any other suitable criteria.

Receiver

The data source 104 transmits data via the second communications medium 210 to the receiver 106, which then provides the information to the user. To facilitate reception of the information, receiver 106 is suitably configured according to the nature of the second communication medium 210. Accordingly, the receiver 106 may be compatible with any appropriate communication medium, including radio, wireless LAN communications, satellite communications, or any other medium. The receiver 106 may also be configured to operate in conjunction with multiple media to facilitate operation with multiple data sources 104 or various communications media connected to the same data source 104.

Further, receiver 106 is suitably configured to transmit data information received from data source 104 to a system user. Information may be provided to the user directly, such as via a direct connection to a user interface, or indirectly, such as via a server in a multi-user environment.

Figures 6, 7:
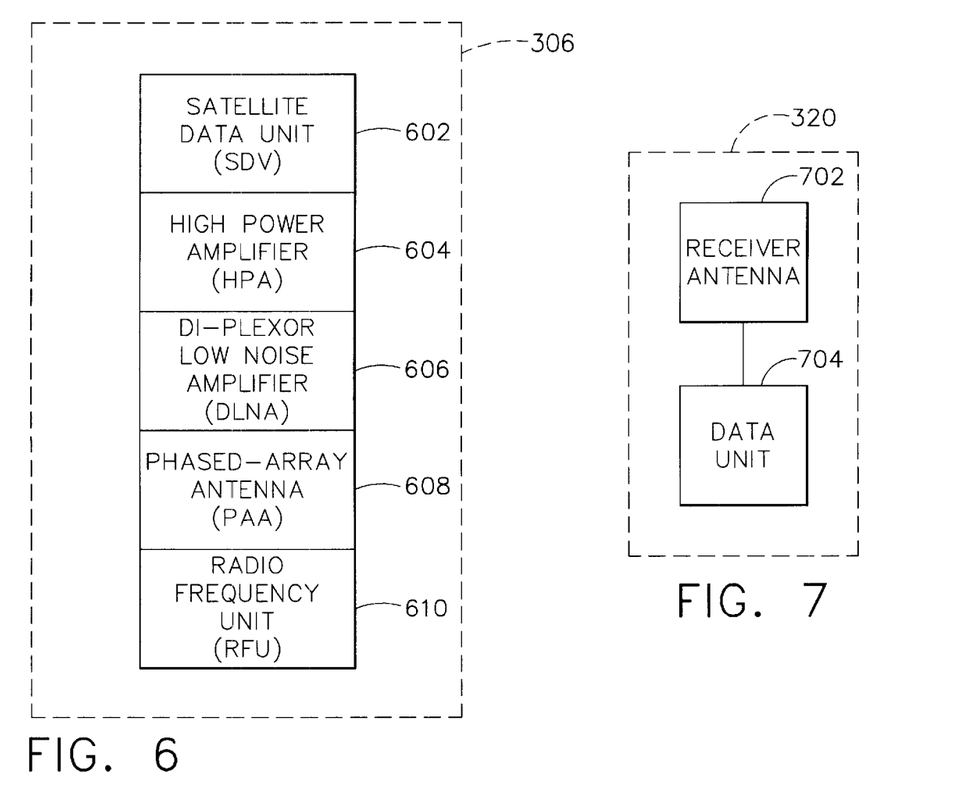
FIG. 6 is a schematic representation of a transmission unit in accordance with a preferred embodiment of the present invention.
FIG. 7 is a schematic representation of a receiver unit in accordance with a preferred embodiment of the present invention.

Referring now to FIG. 7, in the present embodiment, the receiver 106 is suitably located aboard a passenger vehicle, such as a commercial aircraft, and data for each of multiple users may be routed by a central computer, such as an aircraft LAN. Preferably, receiver 106 is configured to receive information signals from a satellite system, such as, for example, a direct broadcast satellite (DBS) system 318, extract the relevant information from the received signal, and route the information to the appropriate user. Accordingly, by broadcasting requested information to the receiver 106 via satellite system 318, a high data transfer rate, e.g., 30 Mbps, that is significantly cheaper than conventional techniques may be realized. In accordance with a preferred exemplary embodiment, receiver 106 comprises an antenna 702, a data unit 704, a router 308, and a receiver user interface 302. Antenna 702 may comprise any suitable antenna for receiving signals via second communications medium 210, such as a conventional gimbaled antenna or a phased-array antenna configured to receive satellite signals. In the present embodiment, antenna 702 comprises a DBS receiver antenna configured to receive information signals from DBS satellite 318, such as an antenna configured to rotate into a particular desired position based on the signal strength from a particular DBS satellite 318. Further, the antenna 702 may include other components configured to receive signals via other communications media, such as a wireless LAN interface, a VHF receiver, a cellular receiver, or any other appropriate mechanism for receiving signals from the data source 104.

Signals from the antenna 702 are transmitted to the data unit 704 to extract the relevant information from the signal. Data unit 704 preferably comprises a system configured for processing signals received by antenna 702, such as the broadcast signals from DBS satellite 318. Accordingly, data unit 704 may include amplifiers, filters and other like components to facilitate the processing of received signals into data information to be forwarded to the receiver user interface 302. The data unit 704 may also perform additional processing or conditioning, such as error checking and formatting. Data unit 704 may also store the received information in a memory (not shown), especially frequently requested data. The information may then be provided to a user who later requests the identical data, such as a frequently requested internet home page.

Upon receiving and processing the signals, the information is delivered to the system user via receiver user interface 302. In one embodiment, the information is delivered directly to the receiver user interface 302 from the data unit 704. In a multi-user environment, data unit 704 provides the information to the router 308 which routes the information to the appropriate receiver user interface 302. Preferably, router 308 comprises data terminating equipment and/or software capable of identifying the appropriate receiver user interface 302 for the requested information and transmitting the information accordingly. In addition, as described in greater detail below, with momentary reference to FIG. 2, router 308 may also be configured to manage requests from multiple request user interfaces 202 and route them to the appropriate portions of a transmission unit 206. In accordance with a preferred embodiment, router 308 communicates with other components in the information request system 102 and the receiver 106 using an avionics communication protocol, such as W429, via a two- or four-wire connection. Alternatively, router 308 may communicate using other communication protocols and systems, such as CEPTE1 via a cable suitably configured for an RJ45 telephone connector. In yet another alternative embodiment, router 308 may be to transmission unit 306 via cable suitably configured for a conventional RJ11 connector. In the present embodiment, the router 308 is implemented in a central computer of an aircraft LAN 304, which performs multiple functions in addition to those of the router 308. LAN 304 suitably comprises any appropriate central computer, such as a conventional computer server configured for an aircraft LAN or other suitable system.

The information is provided to the user by the receiver user interface 302. The receiver user interface 302 may comprise any suitable system for presenting the information to the user, for example a display or an audio transducer. In the present embodiment, the aircraft includes multiple receiver user interfaces 302 which receive information from the router 308. The receiver user interfaces suitably comprise seat-back displays and/or portable computer systems connected to the router 308 via the aircraft LAN 304.

Information Request System

The information request system 102 is configured to enable a system user, such as a passenger on an aircraft, ship or automobile, to request information from the data source 104 via the first communication medium 208. The information request system 102 is suitably configured to transmit a request via the first communication medium 208 in an appropriate format to be used by the data source 104.

User Interface

Figure 2:
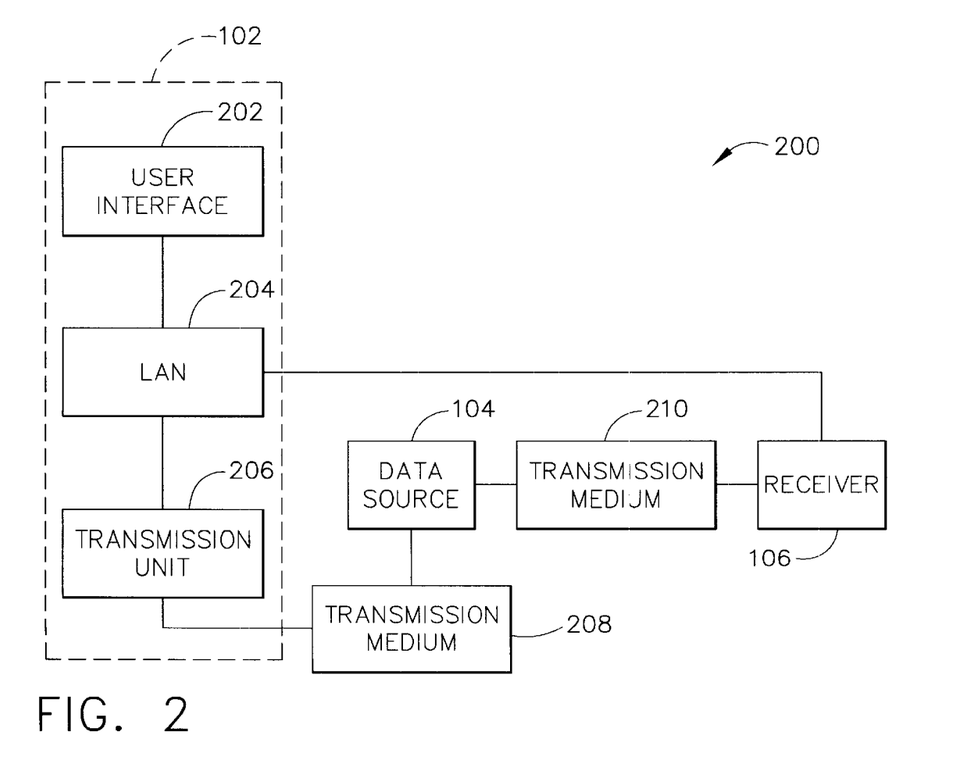
FIG. 2 is schematic representation of a data communication system in accordance with a preferred embodiment of the present invention.

Referring now to FIG. 2, information request system 102 suitably comprises a request user interface 202, a router 308A, and a transmission unit 206. The request user interface 202 facilitates communication between a user and the communications system 100. For example, the request user interface 202 suitably comprises a computer terminal, such as a keyboard or a tracking device in conjunction with a monitor. Alternatively, request user interface 202 may comprise any appropriate system to facilitate the identification of information to be requested from data source 104. In the present embodiment, the request user interface comprises a dedicated keyboard and/or tracking device integrated into the passenger position in the aircraft, such as embedded in the armrest or tray table, or a keyboard and/or tracking device of a portable computer connected to, for example, the aircraft LAN 304 to transmit requests to the transmission unit 206. Preferably, the request user interface 202 is associated with the receiver user interface 302 such that the user transmits requests and receives the requested information at the same location.

Information requests may be submitted directly to the transmission unit 306. In the present passenger aircraft embodiment having multiple users and multiple communications media for transmitting information requests to the data source 104, however, the router 308A receives and processes the information request to properly route the request and manage the transfers of data and requests. The router 308A is suitably implemented by the aircraft LAN 204, and is configured to allow request user interface 202 to communicate with transmission unit 206, a local computer system or other request user interfaces 202. The LAN 204 suitably manages the requests received from the request user interfaces 202 and forwards them to the transmission unit 206. In the present embodiment, the LAN 204 of the transmission request system 102 is also the aircraft LAN 304 used by the receiver 106 to route information received from the data source 104. Alternatively, the information request system 102 may include a dedicated central computer for managing information requests, or the request user interface 202 may connect directly to transmission unit 206.

Transmission Unit

Information requests are transmitted to the data source 104 by the transmission unit 206 via first communication medium 208. Moreover, the transmission unit 206 may also be configured as a transceiver to receive data signals from data source 104 through transmission medium 208 or from various components within transmission medium 208, e.g., an aeronautical satellite system 310, a VHF ground station 412, or a ground-based LAN 512. Accordingly, transmission unit 206 may be configured to validate the contents of the information requests signals sent to the data source 104. In the present embodiment, transmission unit 206 includes multiple transmission mechanisms 810 available for transmitting the request to the data source 104, and a selection system 808 for selecting the appropriate transmission mechanism 810. For example, referring now to FIG. 8, the transmission unit 206 suitably comprises a selection system 808 and multiple transmission mechanisms 810, such as a satellite transmitter unit 602, a VHF radio unit 406, wireless LAN unit 506, and/or voice channel unit 812. Similarly, first communication medium 208 also suitably includes multiple media corresponding to the various transmission mechanisms, i.e., satellite, VHF radio, wireless, voice and/or direct cable or laser signals.

Figure 8:
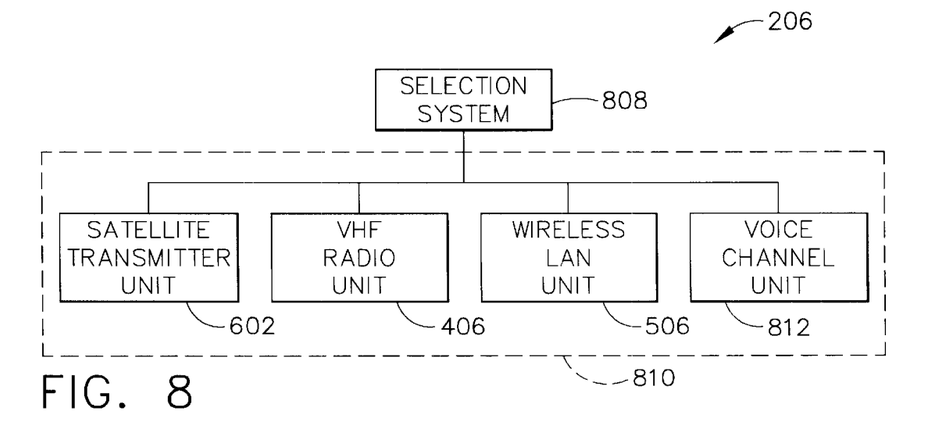

The selection system 808 suitably selects the transmission mechanism 810 for transmitting a request to the data source 104. In the present embodiment, the selection system 808 is implemented by the aircraft LAN 204, though the selection system 808 may be implemented in any suitable manner, such as by an independent microprocessor-based system, a dedicated controller, dedicated logic, or a software-based solution. The selection system 808 selects the transmission mechanism 810 according to a selection criteria. For example, the selection system 808 may select a transmission mechanism according to the availability, signal strength, and/or cost of various transmission mechanisms. The selection system 808 then provides the request to at least one of the transmission mechanisms 810.

Transmission Mechanisms

The transmission mechanisms 810 preferably include multiple mechanisms for transmitting requests to the data source 104 via the first communication media 208. Preferably, the transmission mechanisms 810 include communication components that are available for other purposes in the particular environment. For example, in the present aircraft embodiment, the transmission mechanisms include various transmitters and transceivers used in the conventional operation of the aircraft, such as a satellite data unit, a radio frequency unit, and a wireless LAN unit.

SDU

Referring to FIGS. 3 and 6, transmission unit 306 suitably includes a satellite data unit (SDU) 602 for facilitating communications via satellite, particularly transmitting the request from the information request system 102 to the data source 104. The SDU receives the request and generates a corresponding signal to be transmitted according to any suitable satellite communication technique. For example, the SDU 602 may use a "Data 3" communications protocol (TCP/IP/X.25/W429) to communicate the information request signals to the data source 104. The Data 3 communication protocol provides a standard for a packet switch network to facilitate transmissions without the need for extensive services of telecommunication companies, i.e., without the need for a circuit switched network. Stated another way, the Data 3 communications protocol facilitates the transfer of data information requests directly to a packet switched network at ground station 312. Accordingly, use of Data 3 communications protocol may facilitate transmissions to the data source 104 more cost effectively than voice communications protocols. The communication protocol utilized by the SDU 602, however, may comprise any suitable system, protocol, or technique for transmission of signals via satellite.

In the present embodiment, satellite data unit 602 comprises an embedded data driver unit configured to interface with LAN 304 or other onboard computer system. SDU 602 is suitably configured to provide voice channels as well as data channels for communication and includes an encoder/decoder to facilitate communications with the first communication medium 208, such as, an aeronautical satellite system 310. The transmission unit 306 further suitably includes additional components for processing and transmitting the request, such as a high power amplifier 604, a diplexor low-noise amplifier 606, and a phased-array antenna 608. High power amplifier 604 and low-noise amplifier 606 are suitably configured to facilitate the transmission of signals from SDU 602 to phased-array antenna 608, for example by amplifying and filtering the signal according to conventional techniques. Upon receiving communication signals from SDU 602, phased-array antenna 608 is suitably configured to transmit the signals to data source 104 through the first communication medium 208.

RF Unit

In addition, transmission unit 306 may further include a conventional radio frequency unit (RFU) 610 configured to provide additional channels of communication, such as a conventional MCS7000 radio unit configured to provide seven channels of additional communication. Referring to FIG. 4, in the present embodiment, RFU 610 comprises a VHF radio unit 406. Preferably, VHF radio unit 406 comprises a VHF radio equipped with a modem and suitably configured to provide modem to modem communications, i.e., communication via discrete/analog signals. Moreover, VHF radio unit 406 is preferably coupled to router 308 to facilitate the transferring of data information request from request user interface 302 to VHF radio unit 406. Accordingly, upon receiving the data information requests, VHF radio unit 406 transmits data information request signals via first communication medium 208 to data source 104.

Wireless LAN unit

Referring now to FIG. 5, transmission unit 206 further suitably includes a LAN interface 506 for facilitating communications with an off-board LAN. LAN interface 506 suitably comprises a wireless LAN interface coupled to router 308 to facilitate the transfer of requests from request user interface 302 to the data source 104 via the off-board LAN, which suitably forms part of the first communication medium 208 as described below. The LAN interface 506 may be configured to operate in conjunction with any suitable operating mode and medium, such as wireless communication, direct cable link, optical signal, acoustic signal, and the like.

First Communication Medium

The transmission unit 206 communicates with the data source 104 via the first communication medium 208, which may comprise any suitable medium according to the characteristics of the information request system 102, the data source 104, and any other appropriate factors, such as the distance between the transmission unit 206 and the data source 104. Further, the first communication medium 208 may comprise multiple media, which may be used individually or in any appropriate combination to transfer requests to the data source 104. For example, referring to FIGS. 3–5, various components of the first communication medium 208 suitably include satellites, earth stations such as satellite and VHF communication ground stations, wire and optical networks, such as telephone, cable, and power networks, computer networks, and any other suitable communications medium for transmitting the request to the data source 104. Communication medium 208 may further include public or private communication systems.

Satellite

In accordance with a preferred embodiment, a suitable first communications medium 208 for use in conjunction with satellite data unit 602 comprises an aeronautical satellite system 310, a ground earth station 312 and a conventional telephone network 314 to facilitate the communication of information request signals. Aeronautical satellite system 310 preferably comprises a satellite unit configured to receive data request signals from transmission unit 306 and forward or transmit the signals to ground earth station 310, i.e., serve as a repeater for the data request signals. Preferably, satellite system 310 comprises an array of satellites strategically orbiting the world, such as the Inmarsat Aeronautical Satellite Communications System or any other suitable satellite communication system, to facilitate the efficient communication of signals substantially regardless of the location of transmission unit 306. Accordingly, depending on the location of an aircraft, transmission unit 306 suitably selects a particular satellite from satellite system 310, for example according to anticipated cost, clearest signal, or as authorized by the satellite system provider.

Ground earth station 312 preferably includes a transmission and receiving unit capable of communicating with satellite systems and public or private network systems. Various ground earth stations 312 are positioned strategically around the earth in a manner to effectively communicate with a plurality of satellite systems 310. Preferably, a particular ground earth station 312 is selected as a result of the particular satellite system 310 chosen by information request system 102. Alternatively, information request system 102 can select a particular ground earth station 312 and then utilize a particular satellite system 310 associated the selected ground earth station 312.

Upon receiving information request signals from transmission unit 306 via satellite system 310, ground earth station 312 is suitably configured to transmit the request signals to telephone network 314, or alternatively, directly to data source 315.

Network 314 preferably comprises a general network system configured to transmit data or voice communications between various communication systems, such as ground stations, internet service providers, direct broadcast systems, or home computer systems. Accordingly, network system 314 can be a private network or a public network, such as a telephone network or television cable network, or any other suitable system for communicating the request to the data source 104. Preferably, network system 314 is suitably configured to receive information request signals from ground earth station 312 and transmit the signals to data source 104.

VHF Radio

Referring to FIG. 4, first communication medium 208 may also include a VHF ground station 412 and network system 314. In accordance with this embodiment, VHF ground station 412 preferably includes a transmission and receiving unit capable of communicating with VHF radio systems and public or private network systems. In accordance with a most referred embodiment, a plurality of VHF ground stations 412 are provided strategically around the earth in a manner to effectively communicate with VHF radio unit 406 as it relocates to various positions throughout the world. Accordingly, upon receiving information request signals from VHF radio unit 406, VHF ground station 412 is suitably configured to transmit the request signals to network system 314, or alternatively, directly to data source 104.

Airport LAN

Further, referring to FIG. 5, first communication medium 104 may also include a ground-based LAN 512 and network system 314. In accordance with this embodiment, ground-based LAN station 512 preferably includes a transmission and receiving unit capable of communicating with the LAN interface 506. In accordance with one embodiment, ground-based LAN 512 is an airport LAN configured to communicate with aircraft operating in the airport area, for example within 1000 feet for a wireless LAN 512. The LAN interface 506 may communicate with the LAN 512 in any appropriate manner, including direct electrical or optical connection, acoustic signals, optical signals, infrared signals, microwave signals, cellular communications, or any other suitable communication technique. Accordingly, upon receiving information request signals from LAN interface 506, ground-based LAN 512 transmits the request signals to the data source 104, for example via network system 314, or alternatively, directly to data source 104.

Voice Channel

First communication medium 208 may also accommodate transmission of requests over available voice channels. Accordingly, first communication medium 208 may comprise a voice channel communication protocol and a ground station configured to receive voice channel communications. Still further, transmission unit 206 may be configured to be directly coupled to a ground station or data center. Accordingly, first communication medium 208 may comprise a cable, an umbilical cord or wires and/or the like suitably configured to connect transmission unit 206 directly to a ground station or other data center. Still further, communication medium may comprise an infra-red laser connection suitably configured to transmit information request data from transmission unit 206 to a ground station or other local data center. Transmission unit 206 and first communication medium 208 may be configured in any manner to facilitate the transmission of information requests from request user interface 302 to data source 104.

Operation

In the present embodiment, the information request system 102 and the receiver 106 are implemented aboard an aircraft or other vehicle for use by the crew and/or the passengers. Using the information request system 102, requests for information may be submitted to the data source 104, which then transmits the information to the receiver 106. As relevant conditions change, the first and second communication media 208, 210 may vary according to any suitable criteria.

For example, when an aircraft is located next to a loading terminal, system users, such as the pilots or crew members, may request information, such as weather information.

Because the aircraft is within range of the airport LAN 512 (FIG. 5), the information request system transmits the request via LAN interface 506. The data source 104 transmits the requested information to the receiver 106, for example via a DBS system 318.

As the aircraft departs and exceed the range of the LAN 512, passengers and crew members may continue submitting information requests through other available transmission mechanisms 510, for example via VHF radio unit 406 and various VHF ground stations 412. If radio communications become less feasible, the selection system 508 may use other transmission mechanisms 510, such as satellite data unit 602. Accordingly, the information request system 102 may select an appropriate transmission mechanism 510 for submitting requests to the data source 104 according to any appropriate criteria. Similarly, the data source 104 may also be equipped to select an appropriate transmission mechanism for providing the requested information to the receiver 106.

General Summary

Thus, through the operation of the preferred embodiment, a system user may request data information from a data source 104 through information request system 102 and first communication medium 208. Upon receiving the data information request, data source 104 may retrieve the requested data and transmit the data to receiver 106 through second communication medium 210. Accordingly, upon receipt of the data from data source 104, receiver 106 may transmit the requested data to the system user.

Closing

The present invention has been described above with reference to a preferred embodiment. However, those skilled in the art will recognize that changes and modifications may be made to the preferred embodiment without departing from the scope of the present invention. For example, the various transmission units may be implemented in alternate ways depending upon the particular application or in consideration of any number of performance criteria associated with the operation of the system. In addition, the techniques described herein may be extended or modified for use with other modes of transportation utilizing a data communication system. These and other changes or modifications are intended to be included within the scope of the present invention, as expressed in the following claims.

I claim:

1. A data communications system for retrieving data information, said data communications system comprising:

a data source comprising a network system for the storage and delivery of the data information;

an information request system comprising a transmission unit coupled to said data source and adapted to request the data information from said data source wherein said transmission unit comprises a satellite data unit and a radio frequency unit;

a first communication medium configured for transmission of requests for the data information from the information request system to said data source, said first communication medium comprising:

an aeronautical satellite system and a ground station, wherein said aeronautical satellite system is adapted to transmit data information requests from said satellite data unit to said ground station, said ground station being coupled to said network system to facilitate the transferring of said data information requests to said network system; and a radio ground station adapted to receive information request signals from said radio frequency unit, wherein said radio ground station is adapted to transmit data information requests from said radio frequency unit to said network system;

a second communication medium comprising a direct broadcast satellite adapted to receive data information from said data source and to broadcast said data information to said receiver;

a receiver coupled to said data source by said second communication medium and adapted to receive the data information requested by said information request system from said data source; and wherein said information request system is configured to select one of said aeronautical satellite system and said radio ground station from said first communication medium for transmission of data information requests.

2. A data communications system according to claim 1, wherein said network system comprises a direct broadcasting system.

3. A data communications system according to claim 1, wherein said information request system further comprises a wireless LAN unit and said first communication medium further comprises:

a LAN ground station adapted to receive information request signals from said wireless LAN unit, wherein said LAN ground station is adapted to transmit data information requests from said wireless LAN unit to said network system, and said network system is adapted to transfer information requests signals to said data source.

4. A method for providing and controlling data communications from a direct broadcast system to a passenger carrier, said method comprising the steps of:

transmitting data information requests from an information request system to a ground station, said transmitting of data information requests provided through one of satellite transmission signals and radio transmission signals by way of selection between one of a satellite data unit and a radio frequency unit;

transmitting the data information requests from said ground station to said direct broadcast system through a network system;

accessing data information corresponding to the data information request from said direct broadcast system;

transmitting the data information from said direct broadcast system to a direct broadcast satellite; and broadcasting the data information from said direct broadcast satellite to a receiver provided onboard said passenger carrier.

5. A method according to claim 4, wherein said step of transmitting data information requests from said information request system to said ground station comprises:

transmitting the data information requests from said satellite data unit to an aeronautical satellite system utilizing said satellite transmission signals; and transmitting the data information requests from said aeronautical satellite system to said ground station using said satellite transmission signals.

6. A method according to claim 4, wherein said step of transmitting data information requests from said information request system to said ground station comprises:

selecting one of a group of transmission mediums comprising an aeronautical satellite system, a radio frequency system, a wireless LAN system and a voice channel system for transmission of the data information requests.

7. A data communications system for a passenger carrier, said system comprising:

a transmission unit comprising a satellite data unit and a radio frequency unit, located on board said passenger carrier and operatively connected to a user interface, said transmission unit being configured to select one of said satellite data unit and said radio frequency unit for transmission of the information request signals, said satellite frequency unit configured for providing satellite transmission signals to an aeronautical satellite system, said aeronautical satellite system being adapted to provide the information request signals to said ground station, and said radio frequency unit for providing radio transmission signals to said ground station, wherein said ground station is adapted to receive the radio transmission signals and transmit said signals to said ground network;

a ground station for receiving information request signals from said transmission unit;

a direct broadcast system for providing data information;

a ground network for linking said ground station and said direct broadcast system to facilitate communications;

a direct broadcast satellite, said direct broadcast satellite adapted to interface and communicate with said direct broadcast system; and a receiver located onboard said passenger carrier and adapted to receive data signals broadcast from said direct broadcast satellite, said receiver being operatively connected to said user interface to facilitate the transmission of said data information from said direct broadcast system to passengers.

8. A data communications system according to claim 7, wherein said transmission unit further comprises a wireless LAN unit, said transmission unit being configured to select one of said satellite data unit, said radio frequency unit and said wireless LAN unit for transmission of the information request signals.

9. A data communications system according to claim 7, wherein said transmission unit further comprises a high power amplifier, a di-plexor low-noise amplifier, and a phased-array antenna, wherein said amplifiers are configured to facilitate transmission of information request signals from said satellite data unit to said phased-array antenna, and said phased-array antenna being configured to transmit the information request signals to said ground station.

10. A data communications system for retrieving data information, said data communications system comprising:

a data source comprising a network system for the storage and delivery of the data information;

an information request system comprising a transmission unit coupled to said data source and adapted to request the data information from said data source, wherein said transmission unit comprises a satellite data unit, a radio frequency unit, and a wireless LAN unit;

a first communication medium configured for transmission of requests for the data information from the information request system to said data source, said first communication medium comprising:

an aeronautical satellite system and a ground station, wherein said aeronautical satellite system is adapted to transmit data information requests from said satellite data unit to said ground station, said ground station being coupled to said network system to facilitate the transferring of said data information requests to said network system; and a radio ground station adapted to receive information request signals from said radio frequency unit, wherein said radio ground station is adapted to transmit data information requests from said radio frequency unit to said network system; and a LAN ground station adapted to receive information request signals from said wireless LAN unit, wherein said LAN ground station is adapted to transmit data information requests from said wireless LAN unit to said network system, and said network system is adapted to transfer information requests signals to said data source;

a second communication medium comprising a direct broadcast satellite adapted to receive data information from said data source and to broadcast said data information to said receiver;

a receiver coupled to said data source by said second communication medium and adapted to receive the data information requested by said information request system from said data source; and wherein said information request system is configured to select one of said aeronautical satellite system, said radio ground station and said LAN ground station from said first communication medium for transmission of data information requests.

11. A data communications system according to claim 10, wherein said information request system comprises a selection system configured to select one of said aeronautical satellite system, said radio ground station and said LAN ground station from said communication mediums for transmission of data information requests to said data source.

12. A data communications system according to claim 10, wherein said transmission unit further comprises:

a high power amplifier:

a di-plexor low-noise amplifier; and a phased-array antenna, wherein said high power amplifier and said di-plexor low-noise amplifier are configured to facilitate transmission of requests signals from said satellite data unit to said phased-array antenna, and said phased-array antenna being configured to transmit the request signals to said data source through said first communication medium.

* * * * *